United States Patent [19]

Fischer et al.

[11] 4,123,217
[45] Oct. 31, 1978

[54] APPARATUS FOR THE MANUFACTURE OF A THERMOPLASTIC CONTAINER WITH A HANDLE

[75] Inventors: Stefan Fischer, Lohmar; Dieter Wollschläger, Königswinter; Helmut Scharrenbroich, Neunkirchen-Seelscheid; Rainer Fischer, Lohmar, all of Germany

[73] Assignee: Maschinenfabrik Johann Fischer, Lohmar, Germany

[21] Appl. No.: 814,759

[22] Filed: Jul. 11, 1977

Related U.S. Application Data

[63] Continuation of Ser. No. 635,066, Nov. 25, 1975, abandoned.

[30] Foreign Application Priority Data

Nov. 30, 1974 [DE] Fed. Rep. of Germany ....... 2456723
Oct. 8, 1975 [DE] Fed. Rep. of Germany ....... 2545014

[51] Int. Cl.² ............................................. B29D 23/03
[52] U.S. Cl. ................................. 425/525; 425/324.1; 425/352; 425/356
[58] Field of Search ................... 425/525, 324.1, 326.1, 425/327, 352, 354, 356

[56] References Cited

U.S. PATENT DOCUMENTS

| Re. 23,564 | 10/1952 | Hobson | 425/527 X |
| 3,649,728 | 3/1972 | Housho et al. | 425/577 X |
| 3,781,395 | 12/1973 | Uhlig | 425/525 X |
| 3,844,698 | 10/1974 | Zanca | 425/528 X |
| 3,850,562 | 11/1974 | Takeuchi et al. | 425/526 X |
| 3,892,513 | 7/1975 | Mehnert | 425/526 X |
| 3,928,522 | 12/1975 | Farrell | 425/525 X |

*Primary Examiner*—Richard B. Lazarus
*Attorney, Agent, or Firm*—Edwin E. Greigg

[57] ABSTRACT

A blow-molding apparatus for producing a flask-like container with a handle has two mold halves which surround a thermoplastic parison for subsequent inflation. Each of the mold halves has a guide channel through which one of a variety of tools may be admitted as complementary pairs. These tools include plungers for defining a region in the parison to serve as the hole of the handle, punches for compressing the plastic material in that same region and, finally, a knock-out mechanism, consisting of at least a ram for knocking out the cooled material so as to form the opening in the container which defines the handle.

16 Claims, 11 Drawing Figures

Fig.5
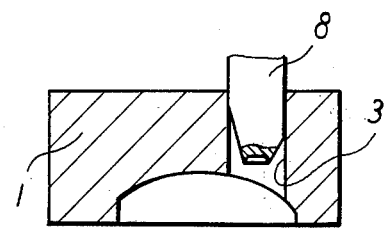
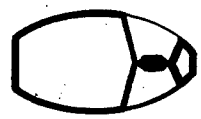
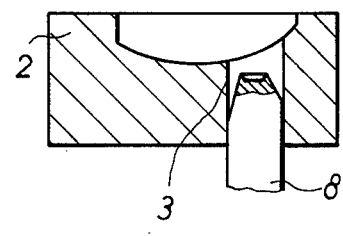
Fig.6
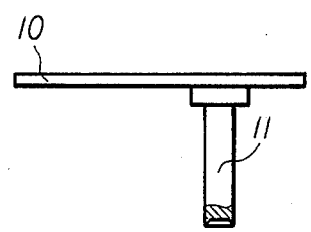
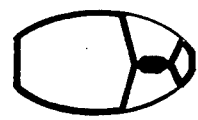
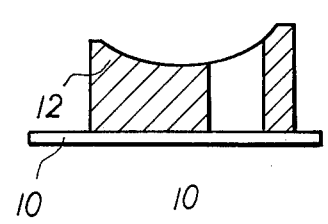
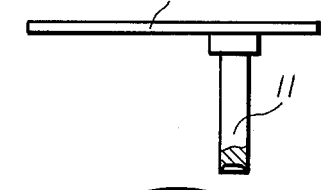
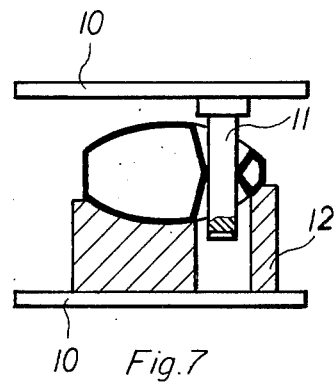
Fig.7
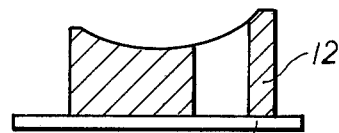
Fig.8

APPARATUS FOR THE MANUFACTURE OF A THERMOPLASTIC CONTAINER WITH A HANDLE

This is a continuation of application Ser. No. 635,066 filed Nov. 25, 1975 and now abandoned.

BACKGROUND OF THE INVENTION

The invention relates to an apparatus for manufacturing a thermoplastic container with a handle. The opening for the hand is formed by joining two opposite walls of the container. The apparatus includes a mechanism for providing a hose-like parison and includes a forming die consisting of substantially two mold halves which may preferably be coolable. The apparatus further includes means for creating the void in the container which creates the handle and these means include plungers that may be moved into the interior volume of the parison from either side. The parison may be formed as a hose or may be injection molded.

The invention relates primarily to containers with handles of the type used for common household applications, for example, for holding laundry or dishwashing materials. The openings for the hand are not usually of constant cross-section, i.e., the size of the opening decreases from the outside of the container toward the vertical symmetry plane. In addition, the molds generally taper in the direction of both their ends.

For producing containers of this type with a handle in an extrusion process, it is known to take a hose with a large diameter in relation to the interior of the blow mold so that the hose is capable of being flattened by by together the two halves of the mold so that its width will be substantially that of the finished article. Thus, as viewed perpendicular to the plane of separation between the two blow mold halves, the hose-like parison extends everywhere beyond the parts of the mold which extend into the interior voids so that the recess to be formed between the handle and the rest of the container is covered by plastic material. In this manner the hose-like parison is clamped by these mold parts and also by the interior surface of the associated molding region. In the subsequent blow molding, the hose is blown up everywhere, i.e., also around this part of the mold. When the blow molding process is terminated and the article is removed, the squeezed portion, which consists of two layers of hose, is knocked out. This apparatus and the associated process has the substantial disadvantage that when the blow mold is closed, the portions of the hose which first come in contact therewith are prematurely cooled off and thus, during the subsequent blow molding, the material is expanded unevenly so that the final container has varying wall thickness.

In another apparatus (Swiss Pat. No. 542,700) the hose is first made into an intermediate parison without a handle whose outside dimensions are smaller than those of the final article but large enough so that, when it is inserted into a second blow mold for being formed into the final container, those portions of the parison which extend into the interior of the mold and are to form the recess between the handle and the container are definitely grasped when the mold halves are closed and the container is thus pinched in this location. The drawback of this apparatus is that it is very expensive and that the process associated therewith is complicated and time-consuming.

OBJECT AND SUMMARY OF THE INVENTION

It is accordingly an object of the invention to provide an apparatus of the type generally described above which does not require the production of an intermediate parison and which makes possible the use of hose with a diameter smaller than the final container. Furthermore, parts of the hose-like parison are not prematurely cooled by contact with the mold. A particular object of the invention is that the apparatus is capable of high quantity mass production.

This object is attained according to the invention by providing the mold halves with recess guide channels and with movable plungers which may be moved in these guide channels. The plungers may be moved so far that they essentially close the channels in the mold and even enter the interior void of the mold. The plungers may be disposed on a rotating platform which also is equipped with punches and rams and which is capable of stepwise rotation.

An apparatus of this type operates as follows:

In the usual manner, a parison which may be produced, for example, by injection molding, is enclosed between the two halves of the mold which are then moved into contact. At the latest thereafter, but possibly even sooner, the blow mold is moved in position between the two rotating platforms. The initial postion of these platforms is such that the plungers may be moved precisely into the recess guide channels provided in the mold halves. When these plungers are introduced into the channels, they enter the interior of the mold and provide support surfaces for the parison to be inflated. The parison is inflated by the admission of pressurized air, generally through a blow pin, and thermoplastic material comes into contact with the walls of the mold, and also with the protruding surfaces of the plungers. Subsequently, the plungers are removed from the guide channels.

The plungers may be made heatable in the region of their tips so that the associated portions of the parison will also be heated and thus a plastic deformation will be particularly enhanced. However, heating means are not required in all cases. If the thermoplastic material is suitably chosen, the plungers need not have any means for external heating.

At this time, the rotating platforms are indexed about their own axis until the slidable punches come to lie opposite the recess guide channels. The punches are then inserted in similar manner as were the plungers and they pull thermoplastic material from adjacent regions and thus form the handle portion of the container. The punches are brought into near contact so that the two wall regions of the parison are touching. Subsequently, the punches are removed from the guide channels. If necessary, these punches may also be heated.

The rotating platforms are now indexed in a further step so that a punch-out mechanism for knocking out the handle opening may be introduced into the channels. It is also possible to provide the punches with cutting edges but knocking out the handle opening be means of the above-cited mechanism is more suitable for obtaining clean surfaces.

These knock-out mechanisms are preferably rams, also located on the rotatable platforms. Suitably, and preferably, these rams may be heatable. When these rams are heated, a cooled blow mold may be used which is desirable for making a cleanly formed handle region. The rotating platform permits the very rapid introduction of the punches after the region of the handles has been heated. In this manner, the time which elapses between heating the handle regions by means of the plungers and their subsequent deformation by the punches is sharply reduced. This fact is of great significance for high quantity mass production. Similar remarks apply to the operation of the knock-out mechanism because this mechanism may also be brought into position very rapidly by means of the rotating platform.

It is particularly advantageous if the surfaces of the plungers facing the interior of the blow mold are similar to those of the subsequently used punches so as to facilitate the deforming operation by means of the punches. In particular, it is suitable if the surfaces touching thermoplastic material are suitably convex and extend somewhat into the interior of the mold when brought into adjacent positions. It may also be suitable to employ more than one pair of cooperating plungers and more than one pair of cooperating punches for each blow mold device so as to permit formation of the handle in several staggered steps and thus proceed in a manner designed to handle the parison carefully. The pair of plungers and punches would come into play sequentially.

It is known from the German Offenlegungsschrift No. 1,176,829 to use displaceable punches in a blow mold process for making containers. However, in this process, no plungers according to the invention are employed which serve, at the same time, for heating the thermoplastic material and for a certain amount of prior deformation of the handle region. Furthermore, the containers described in this publication are of a different type and thus require different apparatus, namely one in which the handle is formed near a container edge, i.e., in the region of two immediately adjacent container walls. By contrast, in the present apparatus, the container has a handle which is formed by two opposite walls. This particular characteristic of the final product permits and makes useful the provision of rotating platforms as according to this invention. These platforms permit a particularly rapid and functional operation which results in a high numerical output of containers or bottles, as already stated.

It should be understood that the manner in which the plungers, punches and rams are moved toward and away from the mold halves within their channels is of no particular importance, and any suitable manner is possible. These elements can be displaced independently of one another and of the rotatable platform or else the entire rotatable platform may be movable transversely with respect to the symmetry plane of the container.

The apparatus according to the invention may also be used if the final container is made in a known stepwise blow molding process. In this process, a first blow mold produces an intermediate parison from a first element (hose, injection molded product) which receives its final form in a second blow mold.

The heating of the tips of the plungers and/or punches (herebelow referred to as "tools") may be done in different ways. For example, these tools may be passed through a heating zone prior to their passage into the channels. However, the direct electrical heating of these tools is most suitable.

The invention will be better understood as well as further objects thereof become more apparent from the ensuing detailed specification of a preferred embodiment taken in conjunction with the drawing.

BRIEF DESCRIPTION OF THE DRAWING

FIGS. 2-5 are cross-sections along the plane A—A through the two halves of the same blow mold, but in different phases of operation;

FIGS. 6-8 are cross-sections through a punch-out mechanism in various phases of operation;

DESCRIPTION OF THE PREFERRED EMBODIMENT

Figure 1:
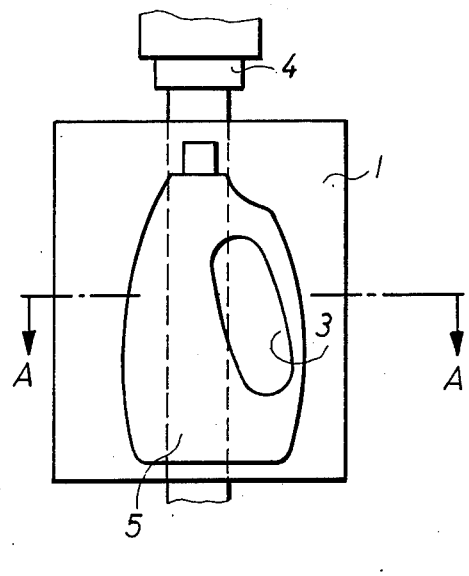
FIG. 1 is a side view of the interior of one mold half.

Turning now to FIG. 1, there is shown a mold half 1 which is part of a blow mold for blow molding a utility flask containing household products. This mold half has a recess 3 which serves for producing the opening of the handle of the flask. Associated with the blow mold is an extruder which is indicated only by its nozzle 4. The extruder may operate vertically in the downward direction and produces the hose-like parison 5, shown here only dotted. The blow mold may be coolable.

Figure 2:
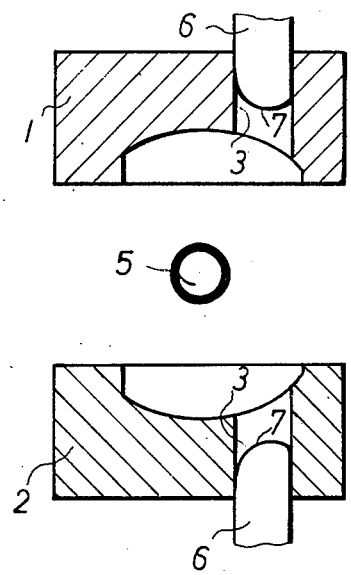

FIG. 2 shows the blow mold in the open state and the second mold half 2 is also visible. In this figure, the hose 5 is located half-way between the mold halves 1 and 2. As may be seen, the previously mentioned channel 3 is a continuous channel penetrating both mold halves 1 and 2. As seen in this figure, a plunger 6 extends into each of the channels. The tips of both plungers have a convex surface 7.

Figure 3:
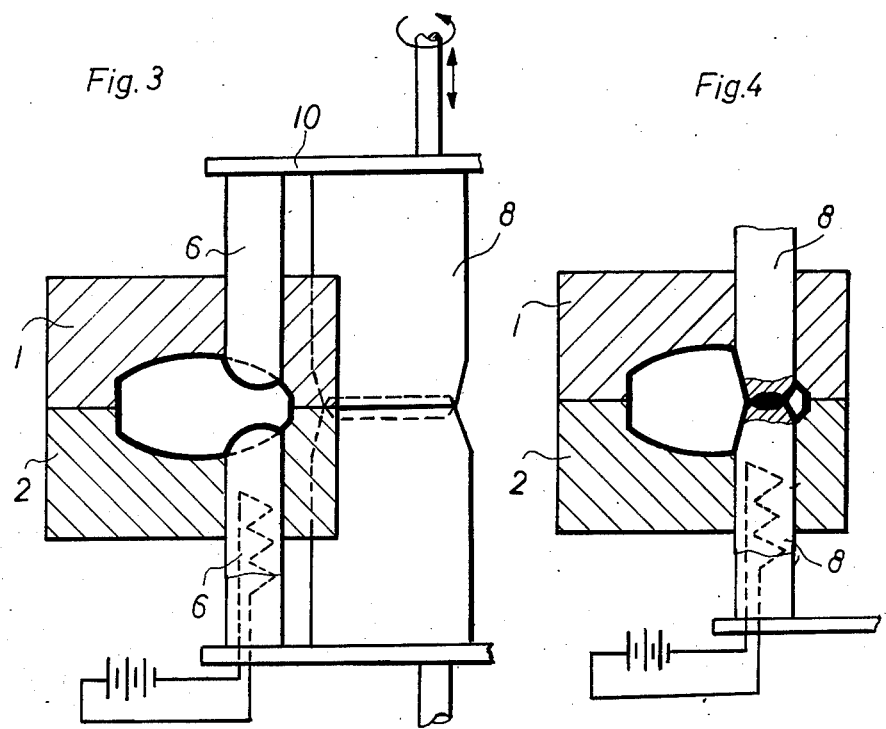

FIG. 3 shows the blow mold in closed state. A blow pin has inflated the hose 5 until it is in contact with the interior wall of the mold everywhere except in the region of the channels. The plungers 6 have also been further introduced into the channels and, in their final position, their tips with surfaces 7 extend into the interior of the mold, producing bulges in the thermoplastic material. This representation also shows the substantial elements of one of the two rotating platforms 10. As may be seen, the rotating platform 10 carries the plunger 6, as well as a punch 8. As shown here the plungers 6 are not yet in contact but are being heated.

Figure 4:
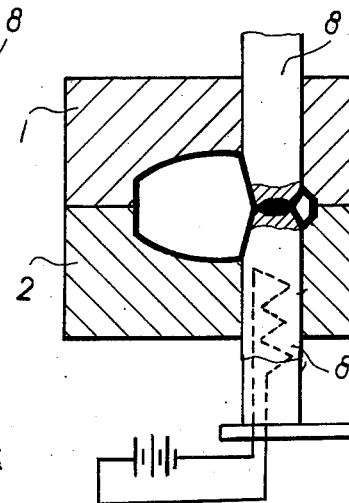

In FIG. 4, the blow mold is still closed, but the plungers 6 have been removed and, in their place, the two punches 8 have been introduced. The ends of these two punches 8 are in close contact and they have squeezed together material from both sides in the region of the channel 3. Thus, the complete region of the handle has been formed.

FIG. 5 shows the mold halves 1 and 2 opened up again so that the substantially completed handled flask is thereby released. The two punches 8 still reside in the channels of the respective halves 1 and 2, but will be removed shortly.

In FIGS. 6-8, the blow mold has been removed from the space between the two rotating platforms 10. These platforms have now been rotated into the position where a ram 11, mounted on one of the rotating platforms, is opposite a die 12 located on the other platform and both of them are aligned with the region defining the hole in the handle of the flask.

FIG. 7 shows the ram 11 and the die 12 after the material in the handle has been punched out.

FIG. 8 shows the two rotating platforms 10 in their separated position. At this point the handled flask is complete.

Under certain circumstances, only a ram 11 could be provided for performing the punch-out operation, thus dispensing with a die 12. In that case, the ram would be introduced through the channel of one of the mold halves 1 or 2 and continue a part of the way into the channel of the opposite mold half.

Figures 9, 10, 11:
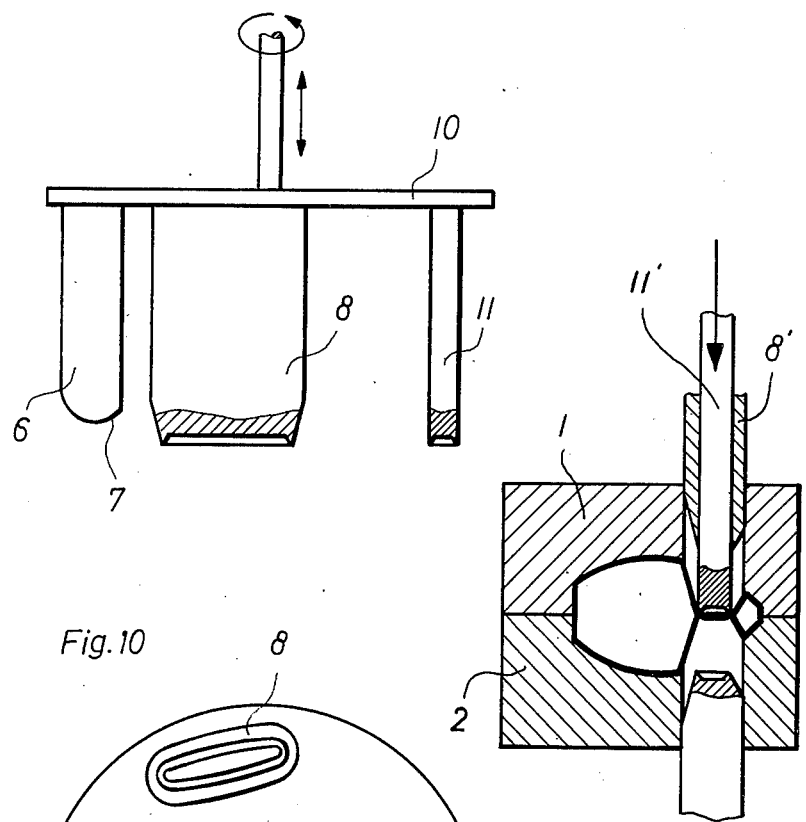
FIG. 9 is a side view of a rotating platform.
FIG. 10 is a bottom view of a rotating platform.
FIG. 11 is a cross-section of an alternative embodiment of the invention.

FIGS. 9 and 10 show a rotating platform 10 including a plunger 6, a punch 8 and a ram 11.

Finally, FIG. 11 shows an alternative embodiment of the invention, in which the upper punch 8' has a longitudinal bore within which is slidably disposed a ram 11' which can be actuated independently of the motion of the punch 8'. When material from both sides has been squeezed together by means of the punches 8', the latter are retracted partly — as shown in FIG. 11 — and the ram 11' is moved forward in order to punch out the squeezed material in the handle.

We claim:

1. A blow molding apparatus for forming containers with handles from thermoplastic material, comprising in combination:
    (a) two complementary mold halves, each defining a cavity which together define the container outline when the mold halves are engaged, and each including a channel which extends through the wall of the mold half and terminates in the cavity, said channels being in alignment when the mold halves are engaged;
    (b) a parison forming means for producing and inserting a parison between the mold halves, said parison forming means being located in proximity to the mold halves so that the parison is held in the cavities by the mold halves when the mold halves are engaged;
    (c) means for supporting said mold halves such that the mold halves are engaged when the parison has been inserted by said parison forming means between said mold halves;
    (d) blow molding means for inflating the thermoplastic material in the closed mold halves;
    (e) a pair of complementary platforms, each having mounted thereon in spaced relationship a punch and a plunger and each located in proximity to a respective one of the mold halves for insertion of said punch and said plunger into the channel of the respective mold half, each punch and plunger defining an indexing position of its respective platform, with both punches and both plungers having a substantially similarly configured free end for engaging the thermoplastic material, and with both punches and both plungers being dimensioned for reception within the channel of its associated mold half; and
    (f) drive means for each platform, said drive means engaging their respective platforms for rotation between their indexing positions and reciprocation toward and away from their associated mold halves at each of their indexing positions, wherein:
        (i) the indexing positions of each platform are further defined by the respective alignment of the punches and plungers with their associated mold half channels;
        (ii) the plungers extend through the aligned channels of their associated mold half and engage the thermoplastic material in the cavity of their associated mold half when the mold halves are engaged and as a result of the platforms being moved by their drive means toward their associated mold half, to thereby form aligned bulges in the thermoplastic material during the process of blow molding the material in the cavities; and
        (iii) the punches extend through the aligned channels of their associated mold half and engage the thermoplastic material in the cavity of their associated mold half at the aligned bulges when the mold halves are engaged and as a result of the platforms being moved by their drive means toward their associated mold half, to thereby squeeze together the thermoplastic material in the region of the bulges, and consequently joining the thermoplastic material forming the bulges, to form spaced adjacent continuous surfaces of the container and handle.

2. The blow molding apparatus as defined in claim 1, further comprising in combination:
    (e) a ram mounted to one of the platforms in spaced relation to the punch and the plunger mounted on said platform, said ram defining a further indexing position of its platform, said ram being dimensioned for reception within the channel of its associated mold half and between the adjacent continuous surface of the container and handle, and having a free end configured to engage and remove the thermoplastic material forming the aligned bulges and situated between the adjacent continuous surfaces of the container and handle, wherein the drive means engages the platform mounting the ram for rotation to said further indexing position and reciprocation toward and away from its associated mold half to effect removal of the thermoplastic material forming the aligned bulges and situated between the adjacent continuous surface of the container and handle by the ram.

3. The blow molding apparatus as defined in claim 1, wherein the tip portion of the free ends of each punch and plunger is similarly configured.

4. The blow molding apparatus as defined in claim 1, further comprising in combination:
    (e) heater means connected to at least the tip portion of the plungers for heating said tip portion during formation of the aligned bulges, with the heated tip portions of the plungers in engagement with the thermoplastic material forming the aligned bulges transferring heat to the thermoplastic material forming the aligned bulges to enhance plastic deformation of the thermoplastic material during formation of the aligned bulges.

5. The blow molding apparatus as defined in claim 1, further comprising:
    (e) heater means connected to at least the tip portion of the punches for heating said tip portion during removal of the thermoplastic material forming the aligned bulges and situated between the adjacent continuous surfaces of the container and handle, with the heated tip portions of the punches in engagement with the thermoplastic material forming the aligned bulges and situated between the adjacent continuous surfaces of the container and handle transferring heat to this portion of the thermoplastic material to enhance the removal thereof.

6. The blow molding apparatus as defined in claim 1, further comprising in combination:
    (e) heater means connected to at least the tip portion of the plungers for heating said tip portion during formation of the aligned bulges, with the heated tip portions of the plungers in engagement with the thermoplastic material forming the aligned bulges transferring heat to the thermoplastic material forming the aligned bulges to enhance plastic deformation of the thermoplastic material during formation of the aligned bulges; and (f) further heater means connected to at least the tip portion of the punches for heating said tip portion during removal of the thermoplastic material forming the aligned bulges and situated between the adjacent continuous surfaces of the container and handle, with the heated tip portions of the punches in engagement with the thermoplastic material forming the aligned bulges and situated between the adjacent continuous surfaces of the container and handle transferring heat to this portion of the thermoplastic material to enhance removal thereof.

7. The blow molding apparatus as defined in claim 1, wherein the tip portion of each plunger is configured as a convex surface.

8. The blow molding apparatus as defined in claim 1, further comprising in combination:

(e) a ram mounted to one of the platforms in spaced relation to the punch and the plunger mounted on said platform, said ram defining a further indexing position of its platform, said ram being dimensioned for reception within the channel of its associated mold half and between the adjacent continuous surfaces of the container and handle, and having a free end configured to engage and remove the thermoplastic material forming the aligned bulges and situated between the adjacent continuous surfaces of the container and handle; and (f) a die mounted to the other platform in spaced relation to the punch and the plunger mounted on said platform, said die defining a further indexing position of its platform, said die being dimensioned to support the blown container which has been removed from the mold halves and receive at least the tip portion of the ram during removal of the thermoplastic material forming the aligned bulges and situated between the adjacent continuous surfaces of the container and handle, wherein the drive means for each platform engages its respective platform for rotation to the further indexing positions of each platform when the ram and die are aligned so that upon reciprocation of both platforms removal of the thermoplastic material forming the aligned bulges and situated between the adjacent continuous surfaces of the container and handle is effected by the ram.

9. The blow molding apparatus as defined in claim 1, further comprising in combination:

(e) a ram mounted to one of the platforms in coaxial relationship to the punch mounted on said platform, said punch having a central bore therethrough, said ram being dimensioned for passage through the central bore and reception within the channel of its associated mold half and between the adjacent continuous surfaces of the container and handle, said ram having a free end configured to engage and remove the thermoplastic material forming the aligned bulges and situated between the adjacent continuous surfaces of the container and handle, wherein the drive means engages the platform mounting the ram for reciprocation of the ram toward and away from its associated mold half to effect removal of the thermoplastic material forming the aligned bulges and situated between the adjacent continuous surfaces of the container and handle by the ram, when the coaxially mounted punch has been withdrawn from engagement with said thermoplastic material.

10. A blow molding apparatus for forming containers with handles from thermoplastic material, comprising in combination:

(a) two complementary mold halves, each defining a cavity which together define the container outline when the mold halves are engaged, and each including a channel which extends through the wall of the mold half and terminates in the cavity, said channels being in alignment when the mold halves are engaged;

(b) a parison forming means for producing and inserting a parison between the mold halves, said parison forming means being located in proximity to the mold halves so that the parison is held in the cavities by the mold halves when the mold halves are engaged;

(c) means for supporting said mold halves such that the mold halves are engaged when the parison has been inserted by said parison forming means between said mold halves;

(d) blow molding means for inflating the thermoplastic material in the closed mold halves;

(e) a pair of complementary platforms, each having mounted thereon in spaced relationship a punch and a plunger and each located in proximity to a respective one of the mold halves for insertion of said punch and said plunger into the channel of the respective mold half, each punch and plunger defining an indexing position of its respective platform, with both punches and both plungers having a substantially similarly configured free end for engaging the thermoplastic material, and with both punches and both plungers being dimensioned for reception with the channel of its associated mold half; and (f) drive means for each platform, said drive means engaging their respective platforms for rotation between their indexing positions and reciprocation toward and away from their associated mold halves at each of their indexing positions, wherein:

(i) the indexing positions of each platform are further defined by the respective alignment of the punches and plungers with their associated mold half channels;

(ii) the plungers extend through the aligned channels of their associated mold half and engage the thermoplastic material in the cavity of their associated mold half when the mold halves are engaged and as a result of the platforms being moved by their drive means toward their associated mold half, to thereby form aligned continuations of the inner wall of the cavity; and (iii) the punches extend through the aligned channels of their associated mold half and engage the thermoplastic material in the cavity of their associated mold half when the mold halves are engaged and as a result of the platforms being moved by their drive means toward their associated mold half, to thereby squeeze together the thermoplastic material in the region of the channels and consequently joining the thermoplastic material in the region of the channels to form spaced adjacent continuous surfaces of the container and handle.

11. The blow molding apparatus as defined in claim 10, further comprising in combination:
- (e) a ram mounted to one of the platforms in spaced relation to the punch and the plunger mounted on said platform, said ram defining a further indexing position of its platform, said ram being dimensioned for reception within the channel of its associated mold half and between the adjacent continuous surfaces of the container and handle, and having a free end configured to engage and remove the thermoplastic material situated between the adjacent continuous surfaces of the container and handle, wherein the drive means engages the platform mounting the ram for rotation to said further indexing position and reciprocation toward and away from its associated mold half to effect removal of the thermoplastic material situated between the adjacent continuous surfaces of the container and handle by the ram.

12. The blow molding apparatus as defined in claim 10, wherein the tip portion of the free ends of each punch and plunger is similarly configured.

13. The blow molding apparatus as defined in claim 10, further comprising:
- (e) heater means connected to at least the tip portion of the punches for heating said tip portion during removal of the thermoplastic material situated between the adjacent continuous surfaces of the container and handle, with the heated tip portion of the punches in engagement with the thermoplastic material situated between the adjacent continuous surfaces of the container and handle transferring heat to this portion of the thermoplastic material to enhance the removal thereof.

14. The blow molding apparatus as defined in claim 10, wherein the tip portion of each plunger is configured as a convex surface.

15. The blow molding apparatus as defined in claim 10, further comprising in combination:
- (e) a ram mounted to one of the platforms in spaced relation to the punch and the plunger mounted on said platform, said ram defining a further indexing position of its platform, said ram being dimensioned for reception within the channel if its associated mold half and between the adjacent continuous surfaces of the container and handle, and having a free end configured to engage and remove the thermoplastic material situated between the adjacent continuous surfaces of the container and handle; and
- (f) a die mounted to the other platform in spaced relation to the punch and the plunger mounted on said platform, said die defining a further indexing position of its platform, said die being dimensioned to support the blown container which has been removed from the mold halves and receive at least the tip portion of the ram during removal of the thermoplastic material situated between the adjacent continuous surface of the container and handle, wherein the drive means for each platform engages its respective platform for rotation to the further indexing positions of each platform when the ram and die are aligned so that upon reciprocation of both platforms removal of the thermoplastic material situated between the adjacent continuous surfaces of the container and handle is effected by the ram.

16. The blow molding apparatus as defined in claim 10, further comprising in combination:
- (e) a ram mounted to one of the platforms in coaxial relationship to the punch mounted on said platform, said punch having a central bore therethrough, said ram being dimensioned for passage through the central bore and reception within the channel of its associated mold hald and between the adjacent continuous surfaces of the container and handle, said ram having a free end configured to engage and remove the thermoplastic material situated between the adjacent continuous surfaces of the container and handle, wherein the drive means engages the platform mounting the ram for reciprocation of the ram toward and away from its associated mold half to effect removal of the thermoplastic material situated between the adjacent continuous surfaces of the container and handle by the ram, when the coaxially mounted punch has been withdrawn from engagement with said thermoplastic material.

* * * * *